US012270948B2

(12) United States Patent
Nyaribo et al.

(10) Patent No.: US 12,270,948 B2
(45) Date of Patent: Apr. 8, 2025

(54) SOURCE-CAMERA ASSEMBLY WITH LIGHT PATH FOR A REFERENCE PIXEL

(71) Applicant: Meta Platforms Technologies, LLC, Menlo Park, CA (US)

(72) Inventors: Jeremiah Nyaribo, Burbank, CA (US); Harish Venkataraman, Buckley, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 219 days.

(21) Appl. No.: 17/981,895

(22) Filed: Nov. 7, 2022

(65) Prior Publication Data

US 2024/0045035 A1 Feb. 8, 2024

Related U.S. Application Data

(60) Provisional application No. 63/395,422, filed on Aug. 5, 2022.

(51) Int. Cl.
*G01S 7/481* (2006.01)
*G01S 17/894* (2020.01)
(Continued)

(52) U.S. Cl.
CPC .......... *G01S 7/4818* (2013.01); *G01S 7/4813* (2013.01); *G01S 17/894* (2020.01);
(Continued)

(58) Field of Classification Search
CPC .... G01S 7/4818; G01S 17/894; G01S 7/4813; H04N 23/56; H04N 23/50; G02B 27/0172; G02B 2027/0138
See application file for complete search history.

(56) References Cited

U.S. PATENT DOCUMENTS 11,650,381 B1 * 5/2023 Polomoff ................. G02B 6/30
 385/49
2006/0189860 A1 * 8/2006 Hacker .............. A61B 5/14553
 600/323
(Continued)

FOREIGN PATENT DOCUMENTS

CN 111929662 A 11/2020
CN 113296114 A 8/2021
(Continued)

*Primary Examiner* — James T Boylan
(74) *Attorney, Agent, or Firm* — Freestone Intellectual Property Law PLLC; Aaron J. Visbeek

(57) ABSTRACT

A source-camera assembly with an isolated light path for a reference pixel is described. The assembly may include a projector, a camera assembly, a reference waveguide, and an overmold. The projector may include a source array configured to emit light and a lens assembly configured to direct the light into a local area. The camera assembly may include a sensor and a reference pixel. The sensor may be configured to detect the emitted light reflected from an object within the local area. The reference waveguide is configured to guide a portion of the light emitted by the projector from the source array to the reference pixel. The light detected by the sensor and the light detected by the reference pixel may be used to determine depth information for the object. The overmold is opaque to the emitted light and covers portions of the projector, the camera assembly, and the reference waveguide.

17 Claims, 5 Drawing Sheets

(51) Int. Cl.
    *G02B 27/01*     (2006.01)
    *H04N 23/50*     (2023.01)
    *H04N 23/56*     (2023.01)

(52) U.S. Cl.
    CPC ......... *G02B 27/0172* (2013.01); *H04N 23/50* (2023.01); *H04N 23/56* (2023.01); *G02B 2027/0138* (2013.01)

(56) References Cited

U.S. PATENT DOCUMENTS

| | | | | |
|---|---|---|---|---|
| 2008/0008477 | A1* | 1/2008 | Ogawa | G02B 6/43 398/164 |
| 2016/0306031 | A1* | 10/2016 | Caley | G01S 17/08 |
| 2017/0038459 | A1* | 2/2017 | Kubacki | G01S 17/36 |
| 2017/0356982 | A1* | 12/2017 | Buettgen | G01S 7/4813 |
| 2019/0041666 | A1* | 2/2019 | Abele | G02B 27/00 |
| 2019/0146069 | A1* | 5/2019 | Etschmaier | G02B 5/20 356/4.01 |
| 2019/0181171 | A1* | 6/2019 | Tadmor | G01S 7/4865 |
| 2019/0187254 | A1* | 6/2019 | Kappel | G01S 7/4808 |
| 2019/0385376 | A1* | 12/2019 | Kim | G06F 3/0482 |
| 2020/0127156 | A1* | 4/2020 | Camarri | H01L 31/02325 |
| 2021/0080546 | A1* | 3/2021 | O'Connor | G01S 7/4814 |
| 2022/0082663 | A1* | 3/2022 | Chou | G01S 17/10 |
| 2022/0082672 | A1* | 3/2022 | Chou | G01S 17/08 |
| 2023/0266441 | A1* | 8/2023 | Coffy | G01S 7/4813 257/82 |
| 2024/0134015 | A1* | 4/2024 | Nakamura | G01S 17/894 |

FOREIGN PATENT DOCUMENTS

| | | |
|---|---|---|
| WO | 2020049126 A1 | 3/2020 |
| WO | 2022077149 A1 | 4/2022 |

\* cited by examiner

SOURCE-CAMERA ASSEMBLY WITH LIGHT PATH FOR A REFERENCE PIXEL

CROSS-REFERENCE TO RELATED APPLICATIONS

This application claims the benefit of U.S. Provisional Application No. 63/395,422, filed Aug. 5, 2022, which is incorporated by reference in its entirety.

FIELD OF THE INVENTION

This disclosure relates generally to depth cameras, and more specifically to a source-camera assembly with a light path for a reference pixel.

BACKGROUND

Direct time-of-flight (dToF) measures distance to a target based on the time delta between when light is emitted from the light source and when the light returns back to the sensor due to reflection. Since dToF operates in the nano-second and pico-second regime, an accurate reference for when the light source emission begins is critical in order to subtract out the errors in the signal path and the turn on delay of the light source itself.

SUMMARY

A source-camera assembly is described herein. The source-camera assembly may be part of a depth camera assembly, and the depth camera assembly may be integrated into a wearable device (e.g., headset). The source-camera assembly incudes a projector, a camera assembly, and a reference waveguide. The reference waveguide is a light path through which light from a source array of the projector propagates to a reference pixel of the camera assembly. The light captured at the reference pixel may be used (e.g., by a controller of the depth camera assembly) as reference for when light is emitted by the projector. An overmold may be applied to portions of the projector, camera assembly and reference waveguide. The overmold is opaque to light emitted by the projector and prevents stray light from reaching the camera assembly from the projector.

In some embodiments, a source-camera assembly is described. The source assembly includes a projector, a camera assembly, a reference waveguide, and an overmold. The projector includes a source array configured to emit light and a lens assembly configured to direct the light into a local area. The camera assembly includes a sensor and a reference pixel that are both coupled to a sensor substrate, and the sensor is configured to detect the emitted light reflected from an object within the local area. The reference waveguide configured to guide a portion of the light emitted by the projector from the source array to the reference pixel. And the light detected by the sensor and the light detected by the reference pixel are used to determine depth information for the object. The overmold is opaque to the emitted light and covers portions of the projector, the camera assembly, and the reference waveguide.

In some embodiments, a source-camera assembly is described. The source-camera assembly includes a projector, a reference pixel, a reference waveguide, and an overmold. The projector includes a source array configured to emit light into a local area. The reference pixel is adjacent to a sensor, and the sensor is configured to detect the emitted light reflected from within the local area. The reference waveguide is configured to guide a portion of the light emitted by the source array to the reference pixel. The light detected by the sensor and the light detected by the reference pixel are used to determine depth information for the object. The overmold is opaque to the emitted light and covers portions of the projector and the reference waveguide.

Figure 1:
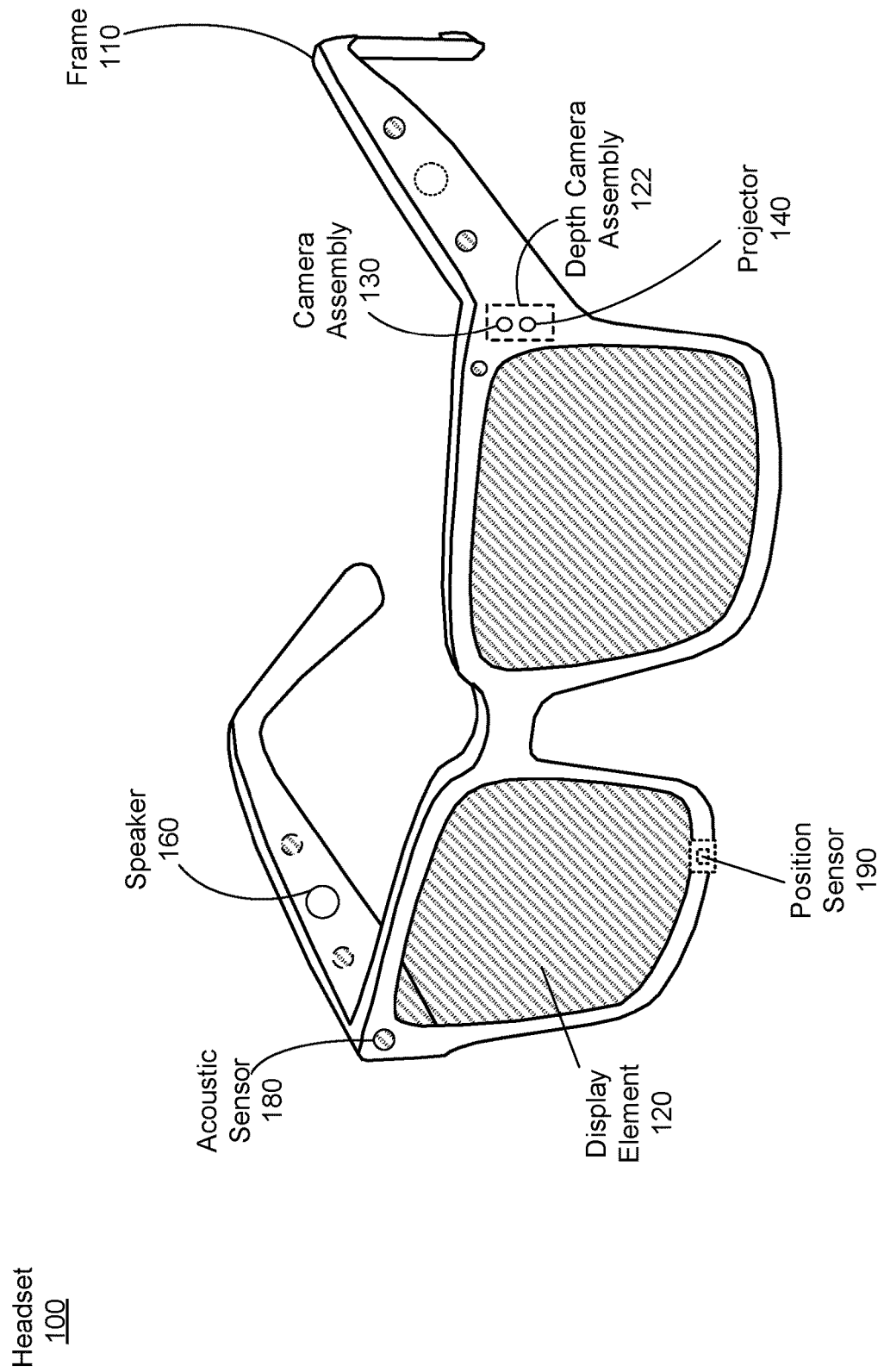
FIG. 1 is a diagram of a headset, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A source-camera assembly is described herein. The source-camera assembly may be part of a depth camera assembly (DCA) that also includes a controller. The DCA may be integrated into a device (e.g., tablet, smartphone, laptop computer), and in some cases the device may be wearable (e.g., headset). The DCA uses the source-camera assembly to determine depth information for the local area using a dToF depth determination technique. The source-camera assembly incudes a projector, a camera assembly, and a reference waveguide. The projector is configured to emit one or more pulses of light in accordance with instructions from the controller. The camera assembly is configured to detect the one or more pulses of light after they have reflected from objects within a local area of the DCA. The reference waveguide is a light path through which light from a source array of the projector propagates to a reference pixel of the camera assembly. The light captured at the reference pixel may be used (e.g., by the controller) as reference signal for when a pulse of light is emitted by the projector, thereby improving dToF depth calculations (e.g., by allowing for correction of errors in the signal path, turn on delay of the light source array, etc.). The overmold may be applied to portions of the projector, camera assembly and reference waveguide. The overmold is opaque to light emitted by the projector and prevents stray light from reaching the camera assembly from the projector.

Note conventional depth determinations systems may use electrical means for referencing when a light sources emits a pulse. However, use of an electrical pathway for referencing, since the pulse is optical, results in a residual electrical-to-optical error that cannot be accounted for. In contrast, the optical reference provided via the reference waveguide removes this error. Additionally, the use of the reference waveguide to provide a light from the light source array as it is emitting light to a reference pixel allows for accurate operation in the nano-second and pico-second regime (e.g., allows for controller to compensate for errors in signal path and turn-on delay of the light source array). This helps ensure relative timing between illumination start and pixel readiness to receive echoes from targets illuminated in the field of view by the aforementioned projector. Without an optical path between transmitter and reference pixel, the time stamp of light emission from the VCSEL would depend on trigger from the ASIC driver. This can be inaccurate and result in inconsistent referencing time stamping for calculating time of flight because of jitter and inductance-induced signal variations between the source array (e.g., VCSEL emitter wells) and the ASIC.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110 and a depth camera assembly (DCA) 122, and may include, among other components, a display assembly including one or more display elements 120, an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA 122 determines depth information for a portion of a local area surrounding the headset 100. The DCA 122 includes a source-camera assembly and a controller (both are shown in n FIG. 2). The source-camera assembly includes a camera assembly 130, a projector 140, and a reference waveguide (not shown). In some embodiments, the projector 140 illuminates a portion of the local area with one or more pulses of light. The light may be, e.g., structured light (e.g., dot pattern, bars, etc.) in the infrared (IR), an IR flash, etc. As described in detail below with regard to FIGS. 2-4B, the reference waveguide is a light path through which light from a source array of the projector propagates to a reference pixel of the camera assembly 130. The light captured at the reference pixel may be used (e.g., by the controller) as reference for when a pulse of light is emitted by the projector 140. The camera assembly 130 capture images of the portion of the local area that include the light from the projector 140. The controller computes depth information for the portion of the local area using the captured images and a time-of-flight depth determination technique. The depth determination technique may be, e.g., dToF or indirect ToF.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer may couple to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the camera assembly 130 of the DCA 122 may also function as the PCA. The images captured by the PCA and the depth information determined by the DCA 122 may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 5.

Figure 2:
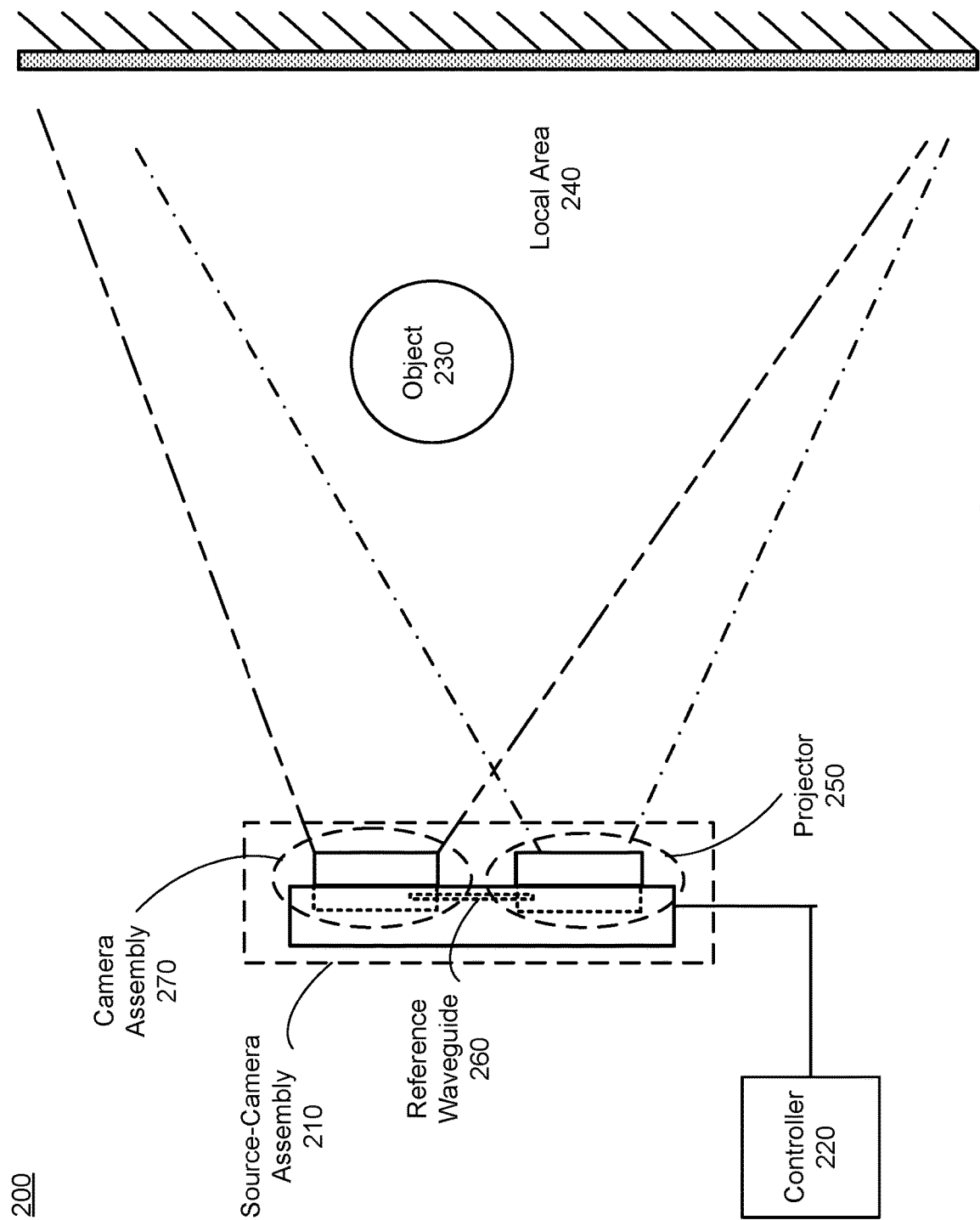
FIG. 2 is a cross-section of a depth camera assembly, in accordance with one or more embodiments.

FIG. 2 is a cross-section of a DCA 200, in accordance with one or more embodiments. As shown in FIG. 2, the DCA 200 includes a source-camera assembly 210 and a controller 220. The DCA 122 may be an embodiment of the DCA 200. The DCA 200 determines depth information for one or more objects (e.g., object 230) that are within a local area 240.

The source-camera assembly 210 is configured to emit pulses of light into the local area 240 and capture reflected pulses of light from objects within the local area 240. The source-camera assembly 210 includes a projector 250, a camera assembly 270, and a reference waveguide 260. In some embodiments, the source-camera assembly 210 may also include an overmold (not shown). Example source-camera-camera assemblies are described in detail below with regard to FIGS. 3, 4A, and 4B.

The projector 250 is configured to illuminate the local area 240 with one or more pulses of light in accordance with instructions from the controller 220. The projector 140 may be an embodiment of the projector 250. The projector 250 includes a source array (not shown). The source array includes a plurality of light sources that emit light in an optical band. The optical band may be, e.g., the infrared or near-infrared (collectively referenced to as "IR"). Examples of light sources include but are not limited to: light-emitting diodes (LEDs), micro light-emitting diodes (μLEDs), micro super luminescent diodes (μSLDs), vertical-cavity surface-emitting lasers (VCSELs), micro resonant cavity light-emitting diodes (μRCLEDs), some other light source that emits light, or some combination thereof. Alternatively, the projector 250 includes a single light source emitting the pulses of light. In some embodiments, the projector 250 includes a lens assembly that in-couples light from the source array and projects the light over at least a portion of the local area 240. The projector 250 may be able to emit light in different bands. Furthermore, the projector 250 may be configured to emit different patterns of light, e.g., structured light (e.g., dot pattern, bar pattern, etc.), a flash (e.g., flood illumination), etc.

The camera assembly 270 is configured to detect light emitted that is reflected from objects (e.g., the object 230) within the local areas 240. The camera assembly 130 may be an embodiment of the camera assembly 270. The camera assembly 270 includes a sensor and a reference pixel (both are not shown in FIG. 2). The sensor includes a plurality of pixels. The plurality of pixels may be, e.g., single-photon-avalanche diodes (SPADs). A same approach can be used in other image sensors such as traditional rolling/global shutter cameras where optical feedback can be used as a replacement for electrical synchronization. The sensor and the reference pixel may both be located on a sensor substrate. The reference pixel is configured to generate a reference signal responsive to receiving light via the reference waveguide 260. In some embodiments, the reference pixel is part of the plurality of pixels. In other embodiments, the reference pixel is separate from the plurality of pixels. The reference pixel may be, e.g., a SPAD, a photodiode, etc. In some embodiments, the camera assembly 270 also includes a lens assembly that focuses light (e.g., the light pulses of light emitted by the projector 250 that are reflecting/scattering off objects within the local area 240) from the local area 240 onto the sensor. The lens assembly may also include one or more filters (e.g., an IR filter) for blocking at least portion of ambient light from reaching the sensor of the camera assembly 270. The camera assembly 270 is sensitive to light in the optical band emitted by the projector 250 (e.g., IR).

The reference waveguide 260 is configured to guide a portion of the light emitted by the projector 250 to the reference pixel. As illustrated there is a single reference waveguide 260 and corresponding reference pixel, but in other embodiments, there may be a plurality reference waveguides, a plurality of reference pixels, or a plurality of reference waveguides and a single reference pixel. The reference waveguide 260 may be, e.g., a plastic that is transparent in the optical band of light emitted by the source array, a fiber, etc.

The overmold is opaque to the optical band emitted by the source array and covers portions of the projector 250, the camera assembly 270, and the reference waveguide 260. The overmold covers the projector 250 except for an aperture (e.g., lens assembly through which it emits light. Similarly, the overmold covers the camera assembly 270 except for an aperture (e.g., lens assembly) through which light from the local area is transmitted to the sensor. The overmold also covers the reference waveguide except for the portions that are interfacing with the projector 250 and the camera assembly 270. Accordingly, the overmold optically isolates the sensor of the camera assembly 270 from any stray light that could otherwise be produced by the projector 250. Moreover, the overmold help protect the projector 250, the camera assembly 270, and the reference waveguide 260 from the environment (e.g., prevents dust, moisture, etc., from getting on the sensor and/or source array). One potential advantage to this is that it allows the camera assembly 270 and the projector 250 to be relatively close to each other. The overmold may be, e.g., an epoxy compound, a liquid crystal polymer, a polycarbonate, etc., some other material that is opaque to light in the optical band of the projector 250, or some combination thereof. A thickness of the overmold may range from, e.g., 0.2 mm to 4.0 mm.

The controller 220 controls components of the source-camera assembly 210. The controller 220 includes one or more processors. Some embodiments of the controller 220 have different functions than those described here. Similarly, functions can be distributed among the components in different manners than described here. For example, some functions of the controller 220 may be performed external to the DCA 200. The controller 220 may instruct the projector 250 to emit one or more pulses of light into the local area 240, and instruct the camera assembly 270 to detect light over one or more corresponding time windows. The controller 220 determines depth information for the one or more objects (e.g., the object 230) in the local area using a ToF depth determination technique (e.g., dToF, iToF) and signals from the sensor (corresponding to detected light) and reference signals from the reference pixel. For example, for a given pulse of light, the reference signal may be used to establish when the pulse of light was emitted, and corresponding signals from the pixels of the sensor establish when reflections of the pulse are detected at the sensor. And the time delta between the reference signal and the signals from the pixels may be used to determine depth information. Note that by using the reference signal instead of, e.g., a trigger sent to the source array to emit a pulse, turn-on delay of the source array is mitigated in the depth calculation. The controller 220 may provide the depth information to a device in which the DCA 200 is coupled to and/or integrated into (e.g., the headset 100, a console, etc.). The device may utilize the depth information to, e.g., generate content for presentation on a display.

Figure 3:
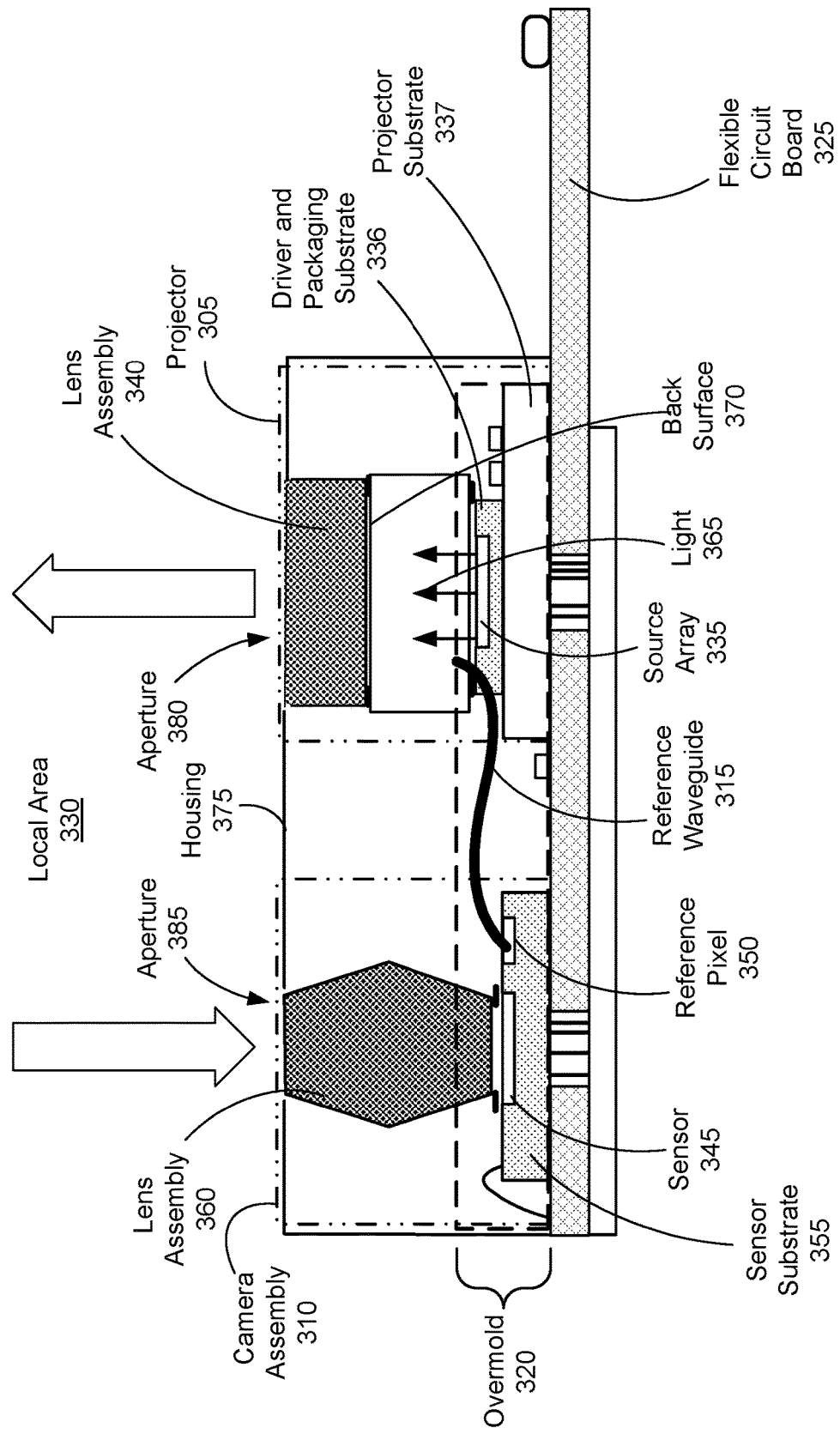
FIG. 3 is a cross section of a source-camera assembly, in accordance with one or more embodiments.

FIG. 3 is a cross section of a source-camera assembly 300, in accordance with one or more embodiments. As shown in FIG. 3, the source-camera assembly 300 includes a projector 305, a camera assembly 310, a reference waveguide 315, and an overmold 320. The source-camera assembly 300 is an embodiment of the source-camera assembly 210. The projector 305 and the camera assembly 310 are coupled to a FCB 325.

The projector 305 is configured to illuminate a local area 330. The projector 305 is an embodiment of the projector 250. The projector 305 includes a source array 335 and a lens assembly 340. The source array 335 and the lens assembly 340 are embodiments of the source array and the lens assembly described above with regard to FIG. 2. The source array 335 emits light 365 (e.g., a light pulse) that the lens assembly 340 projects into the local area 330. Note in FIG. 3, the source array 335 is affixed to a driver and packaging substrate 336. Driver and packaging substrate 336 includes a driver for the source array 335. In some embodiments, the source array 335 is GaAs substrate back side emitting VCSEL. It may have Cu pillars and is thermal compression molded onto the projector substrate 337. The driver and packaging substrate 336 is affixed to a projector substrate 337. The projector substrate 337 is affixed to the FCB 325. The projector substrate 337 may include a Silicon ASIC. The projector substrate 337 may be a, for example, 0.2 to 0.7 mm thick substrate composed of Aluminum oxide (Al2O3), Aluminum Nitride (AlN) or FR4 with Cu layers and vias in the stack. The packaging substrate 336 may have an RDL on the top side with pads to allow SMT'ing some capacitors and resistors. It may also have pads for die-bonding and wirebonding a photodiode to detect any back-scatter from system cover window and the optics to monitor module optical performance.

The camera assembly 310 is configured to detect light emitted that is reflected from objects within the local areas 330. The camera assembly 310 is an embodiment of the camera assembly 270. The camera assembly 310 includes a sensor 345 and a reference pixel 350 that are located on a sensor substrate 355. The camera assembly 310 also includes a lens assembly 360 that focuses light (e.g., the light pulses of light emitted by the projector 305 that are reflecting/scattering off objects within the local area 330) from the local area 330 onto the sensor 345. The sensor 345, the reference pixel 350, the sensor substrate 355, and the lens assembly 360 are embodiments of the sensor, the reference pixel, the sensor substrate, and the lens assembly described above with regard to the camera assembly 270 of FIG. 2.

The reference waveguide 315 is configured to guide a portion of the light 365 emitted by the source array 335 to the reference pixel 350. The reference waveguide 315 is an embodiment of the reference waveguide 260. Note in some embodiments, the light 365 may couple directly into the reference waveguide 315. In other embodiments, the light 365 may scatter of, e.g., a back surface 370 of the lens assembly 340 before coupling into the reference waveguide 315.

The overmold 320 is opaque to the light 365 emitted by the source array 335 and covers portions of the projector 305, the camera assembly 310, and the reference waveguide 315. The overmold 320 is an embodiment of the overmold discussed above with regard to FIG. 2.

A housing 375 protects components of the source-camera assembly 300. The housing 375 includes an aperture 380 for the lens assembly 340 of the projector 305 and an aperture 385 for the lens assembly 360 of the camera assembly 310. The housing 375 may be composed of, e.g., a metal, a plastic, some other material or some combination thereof. In some embodiments, the housing may act as a shield against electromagnetic interference.

Figure 4A:
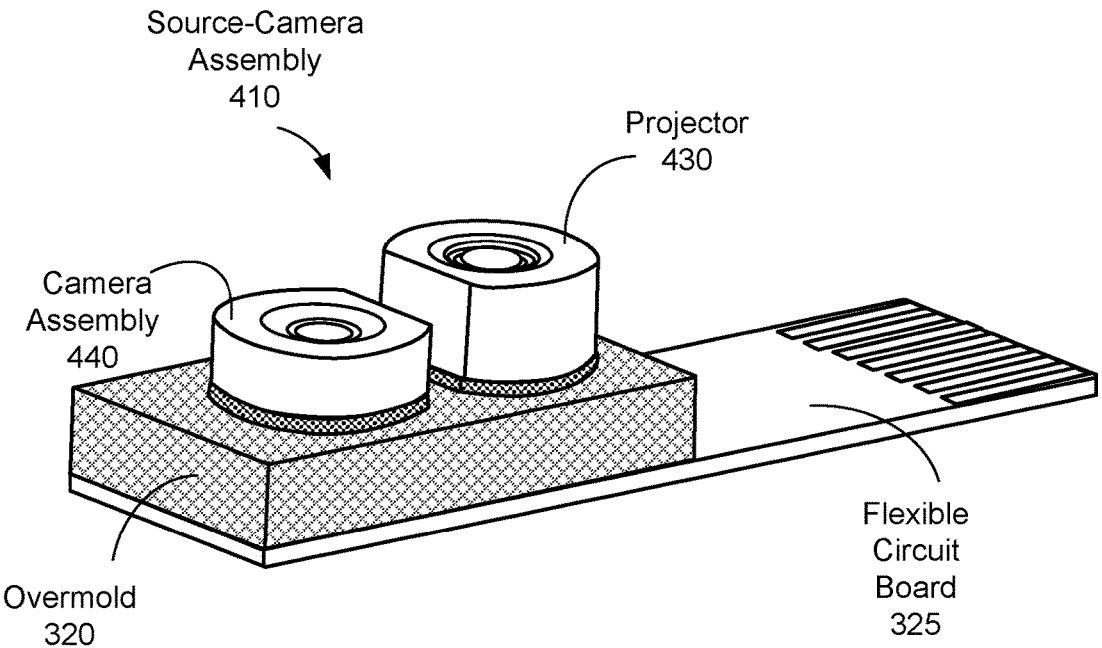
FIG. 4A is a perspective view of a source-camera assembly, in accordance with one or more embodiments.

FIG. 4A is a perspective view 400 of a source-camera assembly 410, in accordance with one or more embodiments. The source-camera assembly 410 is an embodiment of the source-camera assembly 270 and the source-camera assembly 300 that does not show a housing (e.g., the housing 375). As such, in the view 400, the overmold 320 covers portions of a projector 430 and a camera assembly 440 that are coupled to the FCB 325 are shown. Note that the overmold 320 optically isolates a sensor of the camera assembly 440 from light emitted by a source array of the projector 420 that does not exit the lens assembly of the projector 430. The projector 430 is an embodiment of the projector 250, and the camera assembly 440 is an embodiment of the camera assembly 270.

Note that casing (can also be referred to as a lens barrel) for a lens assembly of the camera assembly 440 and a casing (can also be referred to as a lens barrel) for a lens assembly of the projector 430 as show in FIG. 4A do not have circular cross sections. Instead the portions of the casings that are closest to each other are removed. This allows for the camera assembly 440 and the projector 430 to be placed closer together on the FCB 325. This facilitates a small form factor for the source-camera assembly 410, and more generally leads to easier integration into a wearable device (e.g., the headset 100) or some other device (e.g., smart phone, tablet, etc.).

Figure 4B:
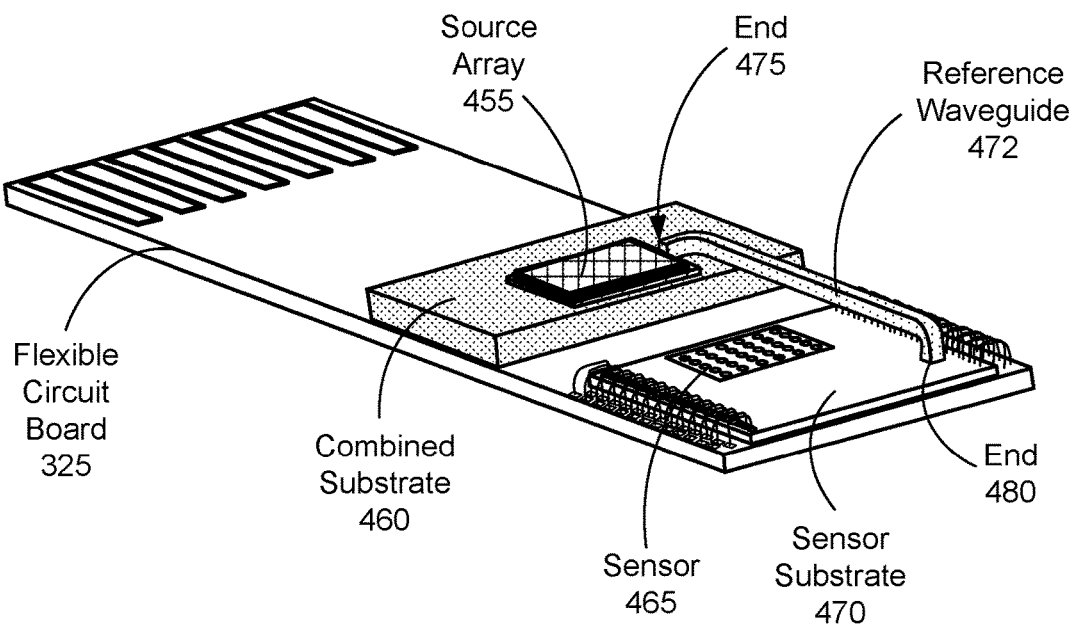
FIG. 4B is a different perspective view of a portion of the source-camera assembly of FIG. 4A without an overmold.

FIG. 4B is a different perspective view 450 of a portion of the source-camera assembly 410 of FIG. 4A without the overmold 320. As the view 450 does not include the overmold 320, components of the source-camera assembly 410 are visible, like, e.g., a source array 455, a combined substrate 460, a sensor 465, a sensor substrate 470, and a reference waveguide 472. The source array 455, the sensor 465, the sensor substrate 470, and the reference waveguide 472, are embodiments, of the source array, the sensor, the sensor substrate, and the reference waveguide 260 discussed above with regard to FIG. 2. The combined substrate 460 is a combination of the driver and packaging substrate 336 and the projector substrate 337.

The reference waveguide 472 is configured to transport a portion of the light emitted by the source array 455 to a reference pixel (not visible in FIG. 4B) on the sensor substrate 470. The reference pixel is substantially the same as the reference pixel described above with regard to FIG. 2. The reference waveguide 472 includes an end 475 and an end 480, and the end 475 is proximate to the source array 455, and the end 480 is proximate to the reference pixel. As illustrated, the reference pixel (i.e., sits directly under the end 480) is closer to the sensor 465 than to the source array 455. And the source array 455 is closer to the sensor 465 than the reference pixel. One advantage of using the reference waveguide 472 is that in increases a design freedom of where to place the reference pixel. For example, in other embodiments, the reference pixel may be positioned between the sensor and the source array (e.g., as shown in FIG. 3).

Figure 5:
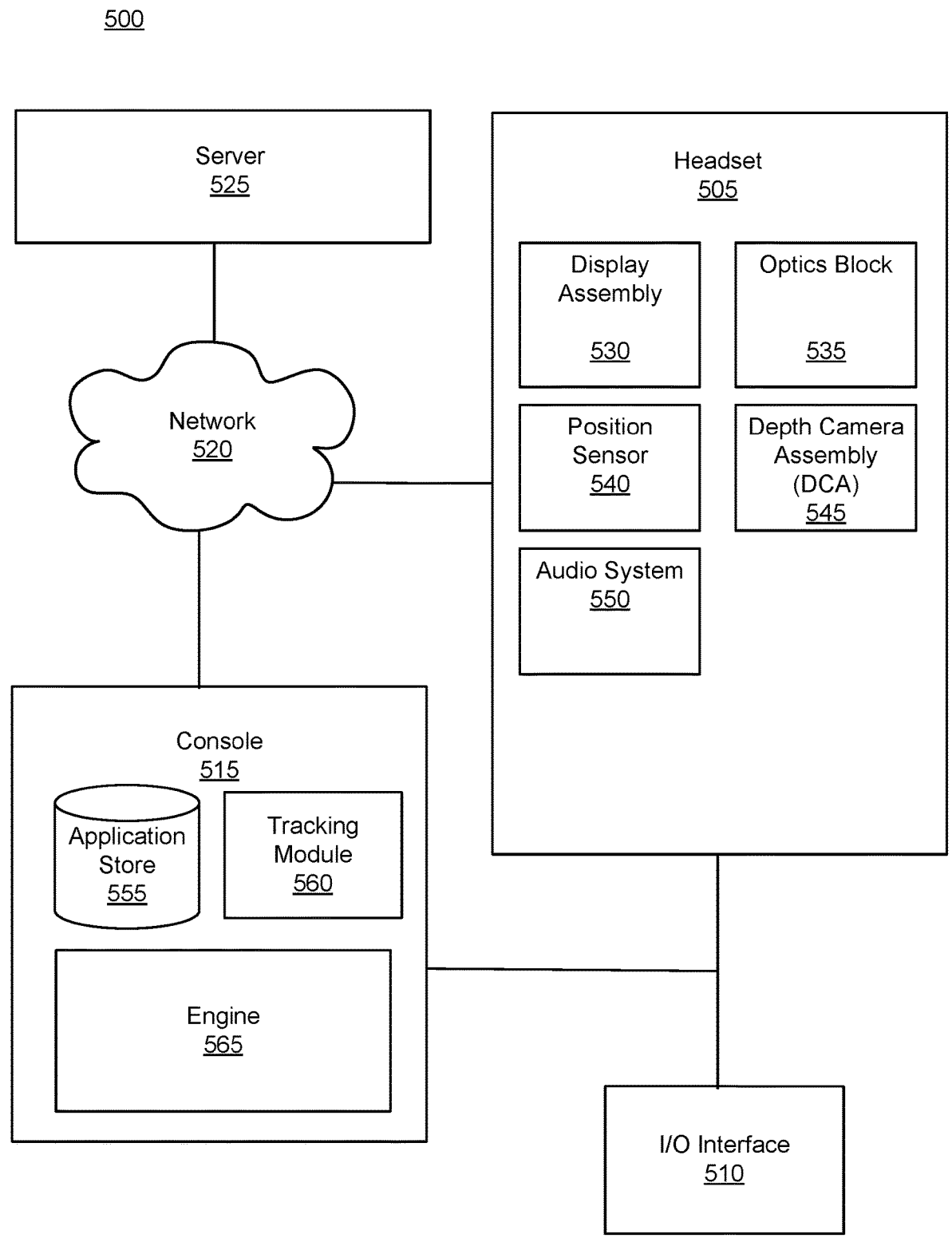
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 190 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes a projector (e.g., the projector 250), a camera assembly (e.g., the camera assembly 270), and a controller (e.g., the controller 220). The DCA 545 includes a reference waveguide and a reference pixel. The reference waveguide is a light path through which light from a source array of the projector propagates to the reference pixel. The light captured at the reference pixel may be used (e.g., by the controller) as reference for when a pulse of light is emitted by the projector for determining depth information. Operation and structure of the DCA 545 is described above with regard to FIGS. 1-4B.

The audio system 550 provides audio content to a user of the headset 505. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the server 525 over the network 520. The acoustic parameters describe one or more acoustic properties (e.g., room impulse response, a reverberation time, a reverberation level, etc.) of the local area. The audio system 550 may provide information describing at least a portion of the local area from e.g., the DCA 545 and/or location information for the headset 505 from the position sensor 540. The audio system 550 may generate one or more sound filters using one or more of the acoustic parameters received from the server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/ Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The server 525 may include a database that stores a virtual model describing a plurality of spaces, wherein one location in the virtual model corresponds to a current configuration of a local area of the headset 505. The server 525 receives, from the headset 505 via the network 520, information describing at least a portion of the local area and/or location information for the local area. The user may adjust privacy settings to allow or prevent the headset 505 from transmitting information to the server 525. The server 525 determines, based on the received information and/or location information, a location in the virtual model that is associated with the local area of the headset 505. The server 525 determines (e.g., retrieves) one or more acoustic parameters associated with the local area, based in part on the determined location in the virtual model and any acoustic parameters associated with the determined location. The server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/ privacy servers (e.g., the server 525) for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A source-camera assembly comprising:
  a projector including a source array configured to emit light and a lens assembly configured to direct the light into a local area;
  a camera assembly including a sensor and a reference pixel that are both coupled to a sensor substrate, wherein the sensor is configured to detect the emitted light reflected from an object within the local area;
  a reference waveguide configured to guide a portion of the light emitted by the projector from the source array to the reference pixel, wherein the light detected by the sensor and the light detected by the reference pixel are used to determine depth information for the object;
  an opaque overmold that is opaque to the emitted light and applied to the projector, the camera assembly, and the reference waveguide; and
  a flexible circuit board (FCB) to which the camera assembly and the projector are coupled, and the opaque overmold also covers a portion of the FCB, wherein the opaque overmold is disposed between the reference waveguide and the FCB.

2. The source-camera assembly of claim 1, wherein the opaque overmold optically isolates the sensor from light emitted by the source array that does not exit the lens assembly.

3. The source-camera assembly of claim 1, wherein the emitted light is in an optical band, and the reference waveguide is a plastic that is transparent in the optical band.

4. The source-camera assembly of claim 1, wherein the reference waveguide is a fiber.

5. The source-camera assembly of claim 1, wherein the reference pixel is closer to the sensor than to the source array.

6. The source-camera assembly of claim 1, wherein the reference pixel is positioned between the sensor and the source array.

7. The source-camera assembly of claim 1, wherein the source array is closer to the sensor than the reference pixel.

8. The source-camera assembly of claim 1, wherein the reference pixel and the sensor are different parts of a single sensor array.

9. The source-camera assembly of claim 1, wherein the reference pixel includes at least one single photon avalanche diode.

10. The source-camera assembly of claim 1, wherein the reference waveguide includes a first end and a second end, and the first end is proximate to the source array, and the second end is proximate to the reference pixel.

11. The source-camera assembly of claim 1, wherein the first end is oriented to incouple light from the emitted pulse that is scattered off the lens assembly.

12. The source-camera assembly of claim 1, wherein the light from the reference pixel is used in combination with the light detected by the sensor to determine depth information via a direct time-of-flight depth determination technique.

13. The source-camera assembly of claim 1, wherein the source-camera assembly is integrated into a wearable device.

14. A source-camera assembly comprising:
  a projector including a source array configured to emit light into a local area;
  a reference pixel that is adjacent to a sensor, wherein the sensor is configured to detect the emitted light reflected from within the local area, and wherein the sensor and the reference pixel are coupled to a sensor substrate;
  a reference waveguide configured to guide a portion of the light emitted by the source array to the reference pixel, wherein the light detected by the sensor and the light detected by the reference pixel are used to determine depth information for the object;

an opaque overmold that is opaque to the emitted light and applied to the projector and the reference waveguide; and a flexible circuit board (FCB) to which the sensor assembly and the projector are coupled, and the opaque overmold also covers a portion of the FCB, wherein the opaque overmold is disposed between the reference waveguide and the FCB.

15. The source-camera assembly of claim 14, wherein the emitted light is in an optical band, and the reference waveguide is a plastic that is transparent in the optical band.

16. The source-camera assembly of claim 14, wherein the reference waveguide is a fiber.

17. The source-camera assembly of claim 1, wherein the opaque overmold covers the reference waveguide except for the portions of the reference waveguide that are interfacing with the projector and the camera assembly.

\* \* \* \* \*